(12) United States Patent
Yoshiike

(10) Patent No.: US 9,952,579 B2
(45) Date of Patent: Apr. 24, 2018

(54) CONTROL DEVICE

(71) Applicant: Hisao Yoshiike, Tokyo (JP)

(72) Inventor: Hisao Yoshiike, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 256 days.

(21) Appl. No.: 14/768,131

(22) PCT Filed: Feb. 15, 2013

(86) PCT No.: PCT/JP2013/053620
§ 371 (c)(1),
(2) Date: Aug. 14, 2015

(87) PCT Pub. No.: WO2014/125606
PCT Pub. Date: Aug. 21, 2014

(65) Prior Publication Data
US 2016/0004241 A1 Jan. 7, 2016

(51) Int. Cl.
G06F 11/00 (2006.01)
G05B 19/042 (2006.01)
G06F 11/20 (2006.01)

(52) U.S. Cl.
CPC ...... G05B 19/0428 (2013.01); G06F 11/2028 (2013.01); G06F 11/2038 (2013.01);
(Continued)

(58) Field of Classification Search
CPC .............. G06F 11/2028; G06F 11/2038; G06F 11/2041; G06F 11/2043; G05B 19/0428; G05B 2219/25143
See application file for complete search history.

(56) References Cited

U.S. PATENT DOCUMENTS 5,596,569 A * 1/1997 Madonna ............ G06F 13/4063
340/2.2
6,301,345 B1 * 10/2001 Suzuki ............ H04M 1/274516
379/1.01
(Continued)

FOREIGN PATENT DOCUMENTS

JP 05-065665 A 7/1993
JP 06-242979 A 9/1994
(Continued)

OTHER PUBLICATIONS

Office Action (Notice of Reasons for Rejection) dated Jun. 14, 2016, by the Japanese Patent Office in corresponding Japanese Patent Application No. 2015-500049 and English translation of the Office Action. (5 pages).

(Continued)

Primary Examiner — Joshua P Lottich
(74) Attorney, Agent, or Firm — Buchanan Ingersoll & Rooney PC

(57) ABSTRACT

A control system CPU card includes a control CPU chip having a first core and a second core, and a main memory for storing information. A standby system CPU card includes a standby CPU chip having a first core and a second core, and a main memory for storing information. An I/F performs communication to allow the CPU cards to share the information. In the control system CPU card, when the first core is normal, the first core performs control calculation and outputs a calculation result. When the first core is abnormal, the second core is switched to a control core, to perform control calculation and continue output of a calculation result. When the cores are both abnormal, system switching is performed from the control system CPU card to the standby system CPU card.

8 Claims, 4 Drawing Sheets

(52) U.S. Cl.
CPC .............. *G05B 2219/25143* (2013.01); *G06F 11/2041* (2013.01); *G06F 11/2043* (2013.01)

(56) References Cited

U.S. PATENT DOCUMENTS

| | | | | |
|---|---|---|---|---|
| 2003/0126498 | A1* | 7/2003 | Bigbee | G06F 11/0712 714/10 |
| 2006/0107112 | A1* | 5/2006 | Michaelis | G06F 11/1654 714/15 |
| 2006/0107114 | A1* | 5/2006 | Michaelis | G06F 11/0721 714/25 |
| 2006/0212677 | A1* | 9/2006 | Fossum | G06F 1/3237 712/1 |
| 2008/0120515 | A1* | 5/2008 | Ritz | G06F 9/5077 713/601 |
| 2008/0120518 | A1* | 5/2008 | Ritz | G06F 11/2025 714/3 |
| 2008/0163255 | A1* | 7/2008 | Munoz | G06F 11/2051 719/318 |
| 2008/0235454 | A1* | 9/2008 | Duron | G06F 11/1064 711/128 |
| 2009/0007121 | A1* | 1/2009 | Yamada | G06F 11/2028 718/102 |
| 2009/0083735 | A1 | 3/2009 | Kimura | |
| 2010/0199046 | A1* | 8/2010 | Weiberle | G06F 11/1641 711/141 |
| 2010/0199049 | A1* | 8/2010 | Yajima | G06F 11/1658 711/141 |
| 2010/0325474 | A1* | 12/2010 | Gopinath | G06F 11/2038 714/4.1 |
| 2010/0325485 | A1* | 12/2010 | Kamath | G06F 11/2097 714/15 |
| 2012/0137163 | A1* | 5/2012 | Sasagawa | G06F 11/2033 714/3 |
| 2012/0159235 | A1* | 6/2012 | Suganthi | G06F 11/2028 714/4.11 |
| 2012/0324452 | A1 | 12/2012 | Kimura | |
| 2013/0024721 | A1* | 1/2013 | Kabulepa | G06F 11/1641 714/5.1 |
| 2013/0254592 | A1* | 9/2013 | Yamada | G06F 11/1492 714/10 |
| 2014/0025991 | A1* | 1/2014 | Anandavally | G06F 11/0793 714/10 |
| 2014/0089734 | A1* | 3/2014 | Busaba | G06F 11/0715 714/16 |
| 2014/0164827 | A1* | 6/2014 | Swanson | G06F 11/2035 714/10 |

FOREIGN PATENT DOCUMENTS

| | | |
|---|---|---|
| JP | 11-134210 A | 5/1999 |
| JP | 2002-342300 A | 11/2002 |
| JP | 2009-069963 A | 4/2009 |
| JP | 2009-080695 A | 4/2009 |

OTHER PUBLICATIONS

International Search Report (PCT/ISA/210) dated Apr. 2, 2013, by the Japanese Patent Office as the International Searching Authority for International Application No. PCT/JP2013/053620.

* cited by examiner

CONTROL DEVICE

TECHNICAL FIELD

The present invention is applicable to a mission critical region such as a nuclear/thermal power plant with a high utilization rate which continuously operates 24 hours a day and every day. The present invention is composed of CPU units in a dual system of a control system and a standby system. Therefore, the present invention relates to a control device which continues control calculation while switching systems upon abnormality detection and thus requires high reliability.

BACKGROUND ART

In a conventional control device applied to a mission critical region, a CPU unit of the control device is composed of a single-core CPU chip. In some cases, the CPU unit itself composes a dual system. Therefore, when abnormality has occurred due to an SEU (Single Event Upset: transient electronic device abnormality caused by radiation), systems are switched immediately to cope with the abnormality.

Another conventional control device uses a technique of making duplication on a CPU chip by multiple cores. This control device uses a function of hypervisor for multicore CPU. Calculators in both systems have each other's data to realize duplication. In this method, when abnormality has occurred due to an SEU, system switching occurs. Further, in the control device, since control calculation is required to be performed in real time, processing of hypervisor becomes overhead (for example, see Patent Document 1).

CITATION LIST

Patent Document

Patent Document 1: Japanese Laid-Open Patent Publication No. 2009-80695

SUMMARY OF THE INVENTION

Problems to be Solved by the Invention

The conventional control device applied to a mission critical region constructs a dual system by a CPU unit having a single-core CPU chip. Therefore, even when transient error has occurred due to an SEU, the conventional control device considers the error to be serious failure and switches the systems. Thus, the conventional control device has a problem that a utilization rate of the CPU unit is low.

Further, the system switching method of the conventional control device used for a single-core CPU chip is applied to the control device having a multicore CPU chip. In this case, when abnormality has been detected in only one core, system switching is performed for each CPU unit even if the other cores normally operate. Therefore, a problem arises that a utilization rate of the CPU unit is deteriorated.

The present invention has been made to solve the above problems, and an object of the present invention is to provide a control device having high reliability and a high utilization rate.

Solution to the Problems

A control device of the present invention includes: a control system CPU card including a control CPU chip having a control core and one or a plurality of standby cores, and a main memory for storing information; a standby system CPU card including a standby CPU chip having a control core and one or a plurality of standby cores, and a main memory for storing information; and an interface for performing communication to allow the control system CPU card and the standby system CPU card to share the information. In the control system CPU card, when the control core is normal, the control core performs control calculation and outputs a calculation result. In the control system CPU card, when the control core is abnormal, one of the standby cores is switched to a core for control, to perform the control calculation and continue output of the calculation result. In the control system CPU card, when the control core and the one or plurality of standby cores are all abnormal, system switching is performed from the control system CPU card to the standby system CPU card.

Effect of the Invention

Owing to the above configuration, the control device of the present invention has high reliability and a high utilization rate.

DESCRIPTION OF EMBODIMENTS

Embodiment 1

Figure 1:
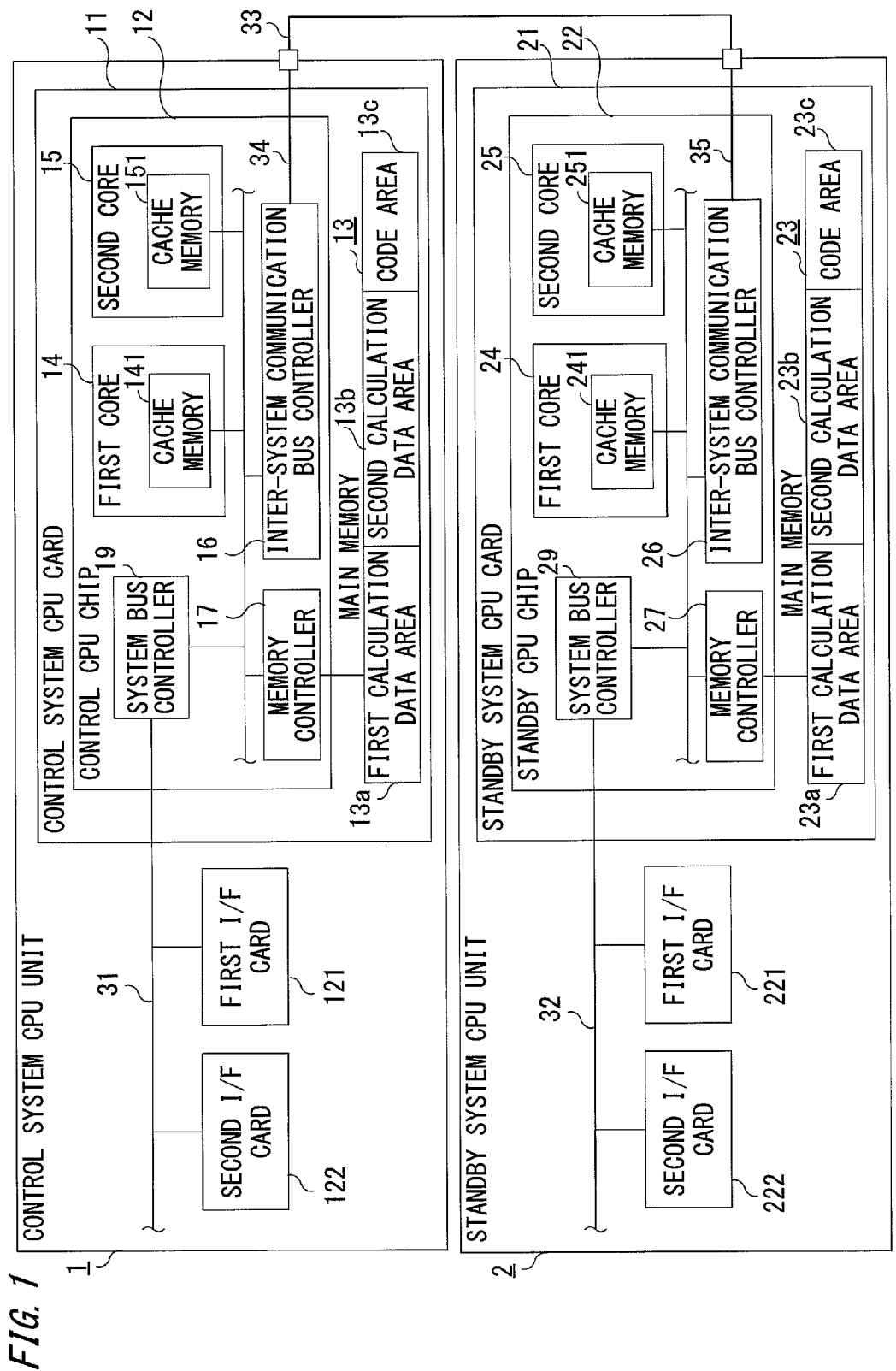
FIG. 1 is a diagram showing the configuration of a control device of embodiment 1 of the present invention.
Figure 2:
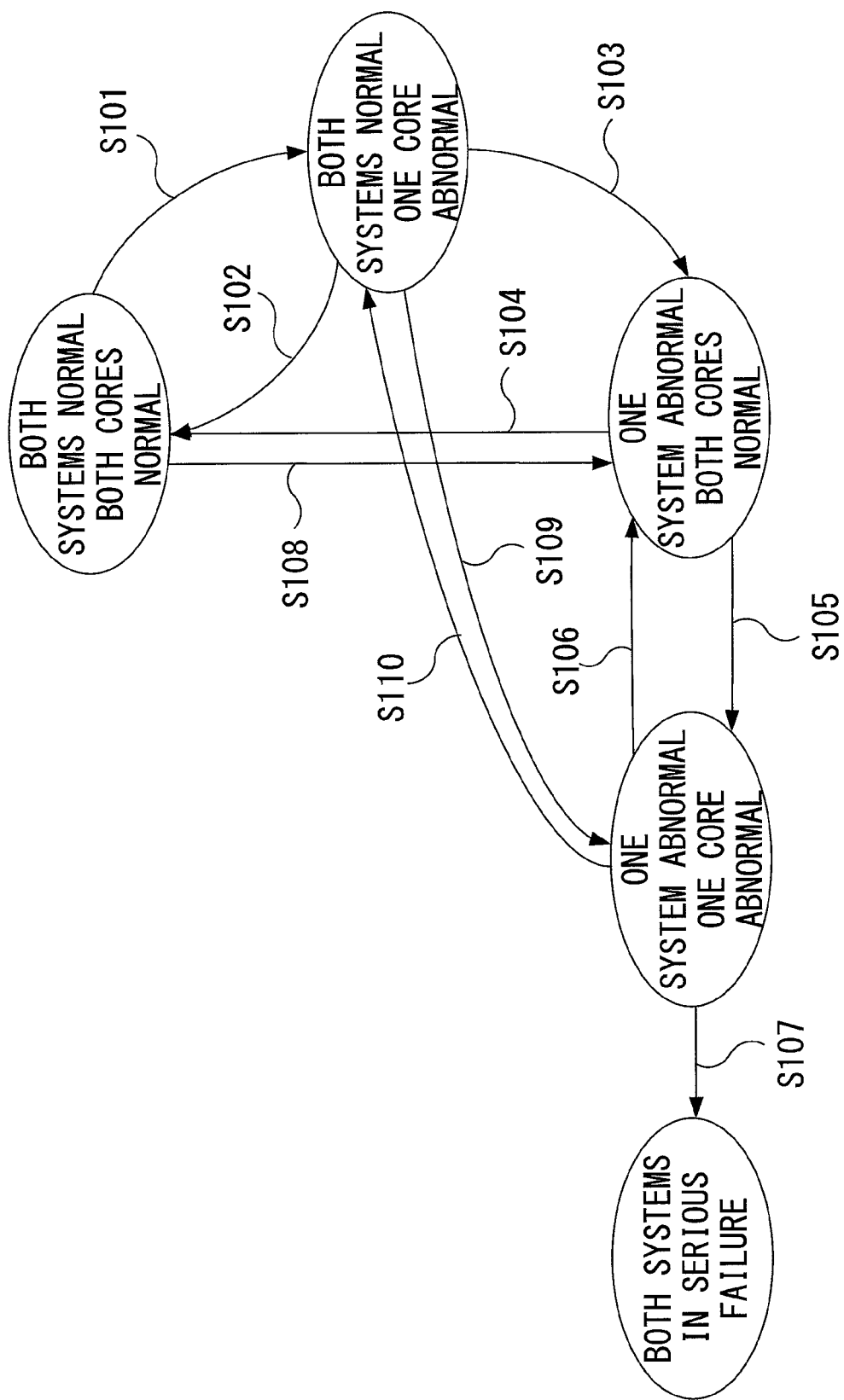
FIG. 2 is a transition diagram for explaining a transition state of the control device shown in FIG. 1.
Figure 3:
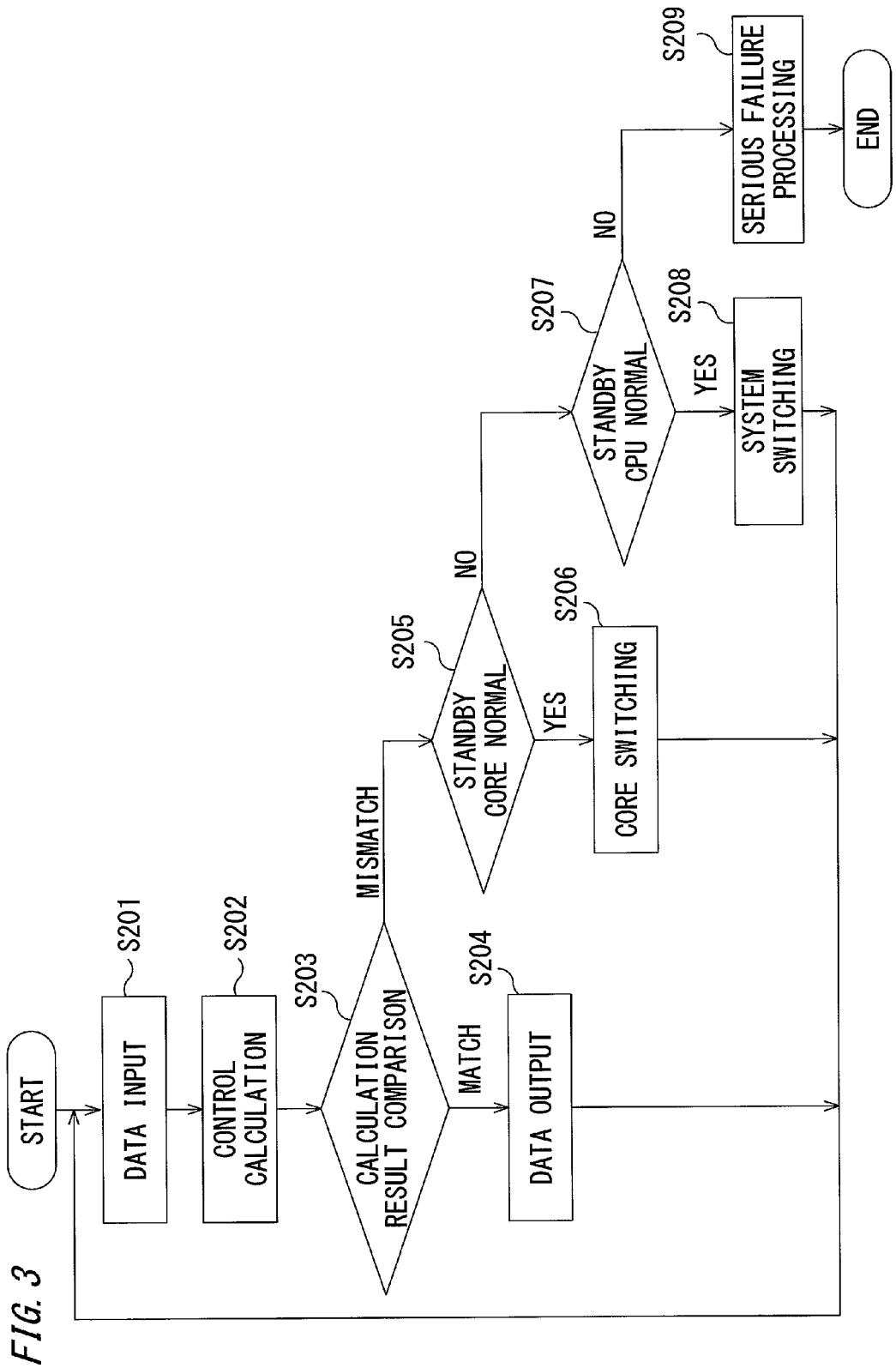
FIG. 3 is a flowchart for explaining operation of the control device shown in FIG. 1.

Hereinafter, an embodiment of the present invention will be described. FIG. 1 is a diagram showing the configuration of a control device in embodiment 1 of the present invention. FIG. 2 is a transition diagram for explaining a transition state of the control device shown in FIG. 1. FIG. 3 is a flowchart for explaining operation of the control device shown in FIG. 1. In the drawings, the control device includes a control system CPU unit 1 and a standby system CPU unit 2. The control system CPU unit 1 and the standby system CPU unit 2 have the same configuration as shown below so as to be able to perform the same control calculation and processing. The control system CPU unit 1 and the standby system CPU unit 2 can perform the same operation. This also applies to the other embodiments shown below, so such description will be omitted as appropriate.

The control system CPU unit 1 and the standby system CPU unit 2 include a control system CPU card 11 and a standby system CPU card 21, first interface (hereinafter, referred to as I/F) cards 121 and 221, and second I/F cards 122 and 222, respectively. The control system CPU card 11 and the standby system CPU card 21 perform control calculation and inter-system communication. The control system CPU card 11 and the standby system CPU card 21 include a multicore control CPU chip 12 and a multicore standby CPU chip 22, and main memories 13 and 23, respectively.

The first I/F cards 121 and 221 and the second I/F cards 122 and 222 are I/Fs between outside of the control device, such as a network, and the control system CPU card 11 and the standby system CPU card 21, and perform such communication via first system buses 31 and 32. An I/F 33 performs communication to allow the control system CPU card 11 and the standby system CPU card 21 to share information. The I/F 33 performs inter-system communication between the control system CPU unit 1 and the standby system CPU unit 2 using inter-system communication buses 34 and 35. Via the I/F 33, the control system CPU unit 1 and the standby system CPU unit 2 construct a dual system.

The control CPU chip 12 and the standby CPU chip 22 include first cores 14 and 24, second cores 15 and 25, system bus controllers 19 and 29, memory controllers 17 and 27, and inter-system communication bus controllers 16 and 26, respectively. The first cores 14 and 24 and the second cores 15 and 25 perform control calculation. The system bus controllers 19 and 29 are respectively connected to the first system buses 31 and 32, and control data to be transmitted to outside of the control device via the first system buses 31 and 32.

The memory controllers 17 and 27 control storage of calculation results of the first cores 14 and 24 and the second cores 15 and 25 into the main memories 13 and 23. The inter-system communication bus controllers 16 and 26 are respectively connected to the inter-system communication buses 34 and 35, and control information necessary for making the systems into a dual system. The main memories 13 and 23 store various types of information.

The main memories 13 and 23 include first calculation data areas 13a and 23a, second calculation data areas 13b and 23b, and code areas 13c and 23c, respectively.

The first calculation data areas 13a and 23a and the second calculation data areas 13b and 23b are areas in which respective calculation results of the first cores 14 and 24 and the second cores 15 and 25 are stored through control by the memory controllers 17 and 27. The code areas 13c and 23c store control calculation codes necessary for performing control calculation. The first cores 14 and 24 and the second cores 15 and 25 respectively include cache memories 141, 151, 241, and 251 for storing calculation results and the like. The cache memories 141, 151, 241, and 251 are memories for enhancing calculation performance of control calculation, and are formed by, for example, SRAM. The cache memories 141, 151, 241, and 251 are used in a write-through mode. Therefore, contents of the cache memories 141, 151, 241, and 251 coincide with contents of the main memories 13 and 23.

Next, control operation of the control device of embodiment 1 configured as described above will be described. First, the control system CPU unit 1 sets the first core 14 as a control core, and the second core 15 as a standby core, in advance. Next, the first core 14 and the second core 15 execute the same control calculation code in the main memory 13. A communication process with the first I/F card 121 and the second I/F card 122 is performed with only the first core 14 which is a control core, by the system bus controller 19.

The first core 14 and the second core 15 periodically perform self-diagnosis for the cache memories 141 and 151 and the like, to detect failure, abnormality, or the like. The first core 14 and the second core 15 perform failure detection, abnormality signal generation, or the like as exception handling by interruption. The inter-system communication bus controller 16 periodically transmits information necessary for control calculation from the control system CPU unit 1 to the standby system CPU unit 2, using the I/F 33 between the control system CPU unit 1 and the standby system CPU unit 2. When the system are switched, the control calculation can be continued by the standby system CPU unit 2 which has been switched to a control system CPU unit. Thus, the standby system CPU unit 2 can execute, as a control system CPU unit, the same control calculation code using the first core 24 which is a control core, the second core 25 which is a standby core, and the like in the same manner as described above.

Next, transition of a switching state of the control device of embodiment 1 configured as described above will be described with reference to the transition diagram in FIG. 2. First, the state starts from "both systems normal, both cores normal" which is a state in which the control system CPU unit 1 and the standby system CPU unit 2 are both normal and the first cores 14 and 24 and the second cores 15 and 25 are both normal. Then, if abnormality is detected in either the first core 14 or the second core 15 of the control system CPU unit 1, the state transitions to "both systems normal, one core abnormal" (step S101 in FIG. 2). At this time, if the core in which abnormality is detected is a control core, the control core is switched to a standby core. Then, the core that has been serving as a standby core is switched to a control core, to continue the control calculation. On the other hand, if the core in which abnormality is detected is a standby core, the control core continues the control calculation.

Then, from the transition state "both systems normal, one core abnormal", if the abnormal core (either the first core 14 or the second core 15) returns from an abnormal state to a normal state, the state transitions to "both systems normal, both cores normal" (step S102 in FIG. 2). In the transition state "both systems normal, one core abnormal", if abnormality is detected in the control core (either the first core 14 or the second core 15) of the control system CPU unit 1, the state transitions to "one system abnormal, both cores normal". In this case, the first core 14 and the second core 15 are both abnormal.

This indicates that system switching is performed between the control system CPU unit 1 and the standby system CPU unit 2. As a result, the standby system CPU unit 2 newly starts as a control system CPU unit. Therefore, since the first core 24 and the second core 25 of the standby system CPU unit 2 which has become a control system are both normal, the state transitions to both cores normal (step S103 in FIG. 2). Then, in the state "one system abnormal, both cores normal", if both cores of the CPU unit in the other system return to normal states, the state transitions to "both systems normal, both cores normal" (step S104 in FIG. 2).

In the state "one system abnormal, both cores normal", if abnormality is detected in either the first core 24 or the second core 25 of the standby system CPU unit 2, the state transitions to "one system abnormal, one core abnormal" (step S105 in FIG. 2). At this time, if the core in which abnormality is detected is a control core, the control core is switched to a standby core. Then, the core that has been serving as a standby core is switched to a control core, to continue the control calculation. Then, from the transition state "one system abnormal, one core abnormal", if the abnormal core (either the first core 24 or the second core 25) returns from an abnormal state to a normal state, the state transitions to "one system abnormal, both cores normal" (step S106 in FIG. 2).

From the transition state "one system abnormal, one core abnormal", if abnormality is detected in the control core in the control system, the state transitions to "both systems in serious failure", so that the control calculation is stopped into a halt state (step S107 in FIG. 2). From the transition state "both systems normal, both cores normal", if abnormality is detected in both the first core 14 and the second core 15 of the control system CPU unit 1, the state transitions to "one system abnormal, both cores normal" (step S108 in FIG. 2). From the transition state "both systems normal, one core abnormal", if abnormality is detected in both the first core 14 and the second core 15 of the control system CPU unit 1 and abnormality is detected in either the first core 24 or the second core 25 of the standby system CPU unit 2, the state transitions to "one system abnormal, one core abnormal" (step S109 in FIG. 2).

From the transition state "one system abnormal, one core abnormal", if normality is detected in either the first core 14 or the second core 15 of the control system CPU unit 1 and normality is detected in both the first core 24 and the second core 25 of the standby system CPU unit 2, the state transitions to "both systems normal, one core abnormal" (step S110 in FIG. 2).

Conventionally, in the control system CPU unit and the standby system CPU unit, if abnormality is detected in a core of one CPU, the systems are switched immediately to stop a process of the control system (control system CPU unit). However, as described above, the control system CPU unit 1 and the standby system CPU unit 2 of embodiment 1 each have multiple cores, and even if abnormality is detected in a core of one CPU, the calculation can be continued by the other core in the same CPU chip. Thus, a device with a high utilization rate can be obtained.

Next, switching operation of the control device of embodiment 1 configured as described above will be described based on FIG. 3. First, the same data is inputted to the first core 14 which is a control core and the second core 15 which is a standby core of the control system CPU card 11 of the control system CPU unit 1 (step S201 in FIG. 3). Next, the first core 14 and the second core 15 execute the same control calculation (step S202 in FIG. 3). Next, the first core 14 and the second core 15 store their respective calculation results into the calculation data area 13*a* of the main memory 13, and compare the calculation results (step S203 in FIG. 3).

Then, as a result of the comparison, if the calculation results match each other, the first core 14 outputs data (step S204 in FIG. 3). Then, the process returns to step S201 to continue the control calculation described above, again. On the other hand, as a result of the comparison, if the calculation results do not match each other (mismatch), the state of the second core 15 which is a standby core is checked (step S205 in FIG. 3). Then, if the check result is normal (YES), the second core 15 which is a standby core is switched to a control core (step S206 in FIG. 3). Then, the process returns to step S201 to continue the control calculation described above, again. On the other hand, if the second core 15 which is a standby core is abnormal (NO), the state of the standby system CPU unit 2 is checked (step S207 in FIG. 3).

If the check result is normal (YES), the standby system CPU unit 2 is switched to a control system CPU unit (step S208 in FIG. 3). Then, the process returns to step S201, the standby system CPU unit 2 becomes a control system CPU unit, and the control calculation described above is continued again on the standby system CPU unit 2 side which has become a control system. On the other hand, if the standby system CPU unit 2 which is a standby system is abnormal (NO), since both systems are abnormal, serious failure processing is determined and the control calculation is stopped (step S209 in FIG. 3).

In the above embodiment 1, the case where the switching between cores is performed based on whether or not calculation results match each other in comparison therebetween has been described as an example. Hereinafter, another case will be described. The other case is applicable to the case where the number of the multiple cores is three or more, that is, two or more standby cores are present.

Similarly to the above embodiment 1, the control core and the standby cores all perform the same control calculation. Next, calculation results of the control core and the standby cores are compared by majority vote. Then, if the majority of the majority vote indicates the calculation result of the control core, the control core performs the control calculation. On the other hand, if the majority of the majority vote does not indicate the calculation result of the control core, the standby core that has a calculation result indicated by the majority of the majority vote is switched to a control core to perform the control calculation.

According to the above embodiment 1, the multiple cores perform the same control calculation using the same input data and compare calculation results, and if the calculation results are different, core switching and system switching are performed, whereby a device having high reliability while maintaining a high utilization rate can be obtained.

Further, if a calculation result is selected by majority vote, a device having higher reliability can be obtained.

Embodiment 2

In the above embodiment 1, an area in the main memory 13 to be used by the first core 14 which is a control core and the second core 15 which is a standby core is divided into the first calculation data area 13*a* and the second calculation data area 13*b*, and the same control calculation is executed. Therefore, the case where, if, for example, ECC error has occurred in the main memory 13, the first core 14 which is a control core and the second core 15 which is a standby core are switched therebetween to continue the calculation, has been shown as an example. In the present embodiment 2, the case where, if a fault such as ECC error has occurred in the main memory 13, the calculation is continued without core switching, will be described.

In the present embodiment 2, the first core 14 which is a control core and the second core 15 which is a standby core both perform the same control calculation, and their calculation results are stored in the respective cache memories 141 and 151. Since the cache memories 141 and 151 are used in a write-through mode, the calculation results in the cache memories 141 and 151 are stored into the first calculation data area 13*a* and the second calculation data area 13*b*, respectively.

A fault occurs in the first calculation data area 13*a* for the first core 14 which is a control core. In this case, the calculation result stored in the second calculation data area 13*b* for the second core 15 which is a standby core is stored into the first calculation data area 13*a* for the first core 14 which is a control core. Thus, the control calculation can be continued by the first core 14 which is a control core.

According to embodiment 2 configured as described above, the same effect as in the above embodiment 1 is provided, and in addition, even if a fault has occurred in a calculation data area for a control core, calculation can be continued by the control core, using a calculation result in a calculation data area for a standby core, whereby calculation efficiency is improved.

Embodiment 3

In the above embodiments, if, for example, parity error has occurred in the first system bus 31, the control calculation can be continued only by system switching because the first core 14 and the second core 15 share the system bus 31.

Figure 4:
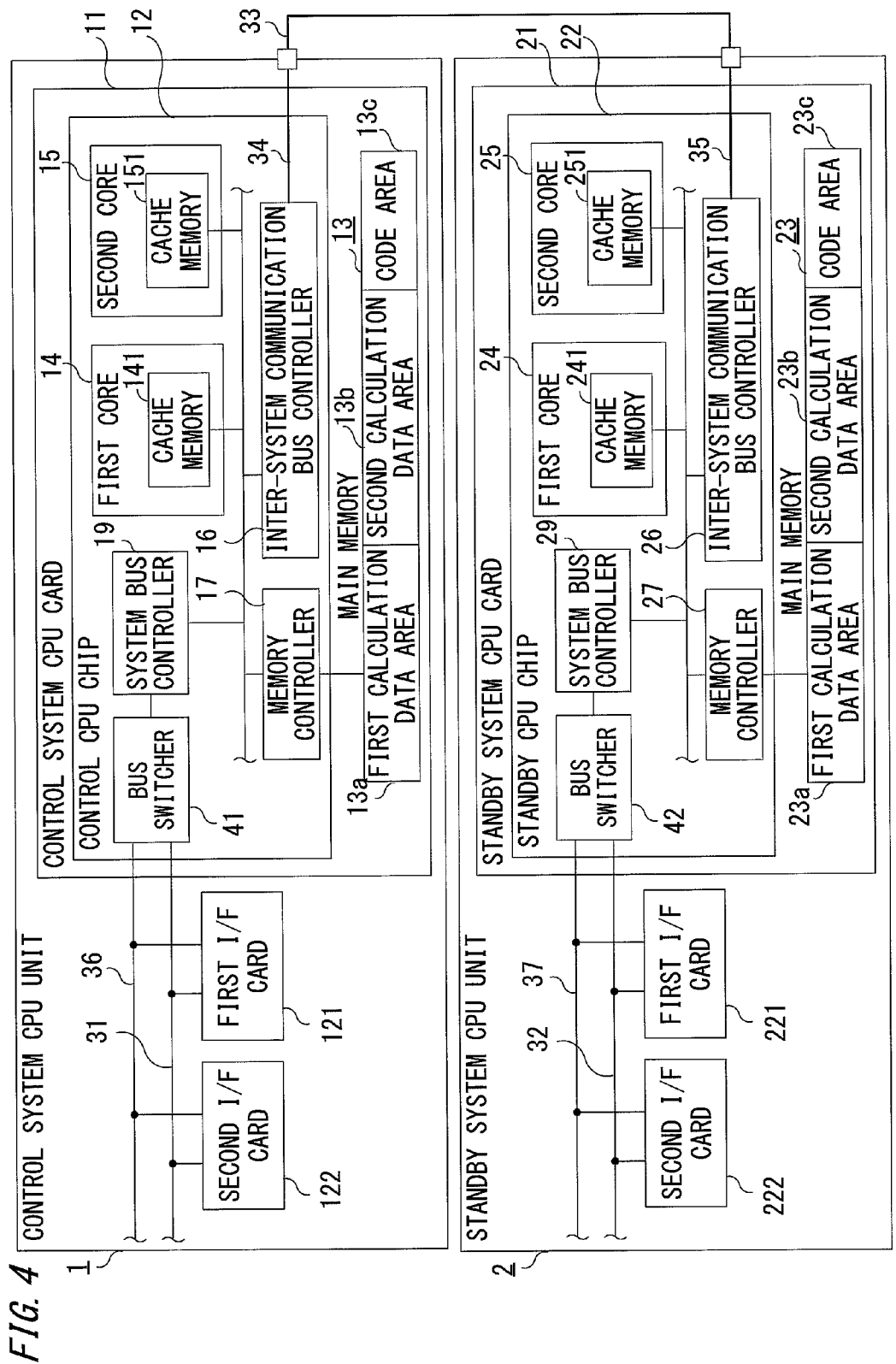
FIG. 4 is a diagram showing the configuration of a control device of embodiment 3 of the present invention.

Therefore, in the present embodiment 3, as shown in FIG. 4, first and second system buses 31 and 36 are provided in a duplicated manner between the control system CPU card 11 and the first and second I/F cards 121 and 122. A bus switcher 41 for switching between the first and second system buses 31 and 36 is provided between the first and second system buses 31 and 36 and the system bus controller 19. Similarly, also in the standby system CPU unit 2, first and second system buses 32 and 37 are provided in a duplicated manner and a bus switcher 42 is provided.

Operation of a control device of embodiment 3 configured as described above will be described. Operation other than system bus switching is the same as in the above embodiments, so the description thereof will be omitted as appropriate. Also in the other embodiments shown below, such system bus switching can be performed in the same manner, so the description thereof will be omitted as appropriate. Normally, using the first system bus 31 selected by the bus switcher 41, communication between the control system CPU card 11 and outside of the control device is performed. If a fault such as parity error has occurred in the first system bus 31, the bus switcher 41 is switched to the second system bus 36. Then, using the second system bus 36, communication between the control system CPU card 11 and outside of the control device is performed. Thus, it is possible to cope with the fault without performing core switching.

According to the control device of the above embodiment 3, the same effects as in the above embodiments are provided, and in addition, in the case of a fault in a system bus, since system buses are provided in a duplicated manner, communication with outside of the control device can be performed by switching between the system buses. Therefore, it is possible to cope with the fault while continuing control calculation, without performing system switching, and as a result, calculation efficiency is improved.

Embodiment 4

In the above embodiments, the cache memories 141, 151, 241, and 251 are set to a write-through mode. Therefore, if transient error has occurred in the cache memory 141, 151, 241, 251, the cache memory 141, 151, 241, 251 is disabled, and data stored in the main memories 13 and 23 is re-read, whereby recovery can be performed. However, since memory writing is performed in a write-through mode, performance of control calculation is lowered.

In the present embodiment 4, the case of setting the cache memories 141, 151, 241, and 251 to a write-back mode will be described. First, similarly to the above embodiments, the same data is inputted to the first and second cores 14 and 15, and the same control calculation is executed. Then, calculation results of the first and second cores 14 and 15 are stored into the respective cache memories 141 and 151. Next, for example, a fault occurs in the cache memory 141 of the first core 14 which is a control core. Next, the calculation result in the cache memory 151 of the second core 15 which is a standby core is stored into the second calculation data area 13b for the second core 15 which is a standby core.

Next, the calculation result in the second calculation data area 13b for the second core 5 which is a standby core is stored into the first calculation data area 13a for the first core 14 which is a control core. Next, the calculation result in the first calculation data area 13a for the first core 14 which is a control core is stored into the cache memory 141 of the first core 14 which is a control core. Then, the control calculation is continued by the first core 14 which is a control core.

According to embodiment 4 configured as described above, even if a transient fault has occurred in a cache memory of a control core, control calculation can be continued without core switching. Therefore, without deterioration in performance of control calculation, recovery processing can be performed, and a utilization rate and reliability can be enhanced. In addition, since cache memories are used in a write-back mode, control calculation can be executed without deterioration in performance.

It is noted that, within the scope of the present invention, the above embodiments may be freely combined with each other, or each of the above embodiments may be modified or abbreviated as appropriate.

The invention claimed is:

1. A control device comprising:
   a control system CPU card including a control CPU chip having a control core and two or more standby cores, and a main memory for storing information;
   a standby system CPU card including a standby CPU chip having a control core and two or more standby cores, and a main memory for storing information; and
   an interface for performing communication to allow the control system CPU card and the standby system CPU card to share information,
   wherein in the control system CPU card,
      when the control core is normal, the control core performs control calculation and outputs a calculation result,
      when the control core is abnormal, one of the two or more standby cores is switched to a core for control, to perform the control calculation and continue output of the calculation result, and
      when the control core and the two or more standby cores are all abnormal, system switching is performed from the control system CPU card to the standby system CPU card, and
   wherein in the control system CPU card,
      the control core and the two or more standby cores perform the same control calculation,
      the calculation results of the control core and the two or more standby cores are compared by majority vote,
      if majority vote indicates the calculation result of the control core, the control core performs the control calculation, and
      if the majority vote does not indicate the calculation result of the control core, the standby core that has the calculation result indicated by the majority vote is switched to a core for control, to perform the control calculation.

2. The control device according to claim 1, wherein
   each main memory has calculation data areas for separately storing calculation results of the control core and the two or more standby cores of the control system CPU card, and
   the control core and the two or more standby cores of the control system CPU card perform the same control calculation and store the respective calculation results into the calculation data areas.

3. The control device according to claim 2, wherein
   first and second system buses are provided to duplicate output of the calculation result of each of the control system CPU card and the standby system CPU card to outside of the control system CPU card and the standby system CPU card, and a bus switcher for, when a fault has occurred in one of the system buses, switching to the other system bus is provided between each of the control system CPU card and the standby system CPU card, and the system buses.

4. The control device according to claim 1, wherein
each main memory has calculation data areas for separately storing calculation results of the control core and the two or more standby cores of the control system CPU card,
the control core and the two or more standby cores of the control system CPU card have cache memories for storing the respective calculation results,
each cache memory is set to a write-back mode, and
the control core and the standby core of the control system CPU card perform the same control calculation and store the respective calculation results into the respective cache memories.

5. The control device according to claim 3, wherein
first and second system buses are provided to duplicate output of the calculation result of each of the control system CPU card and the standby system CPU card to outside of the control system CPU card and the standby system CPU card, and
a bus switcher for, when a fault has occurred in one of the system buses, switching to the other system bus is provided between each of the control system CPU card and the standby system CPU card, and the system buses.

6. The control device according to claim 1, wherein
first and second system buses are provided to duplicate output of the calculation result of each of the control system CPU card and the standby system CPU card to outside of the control system CPU card and the standby system CPU card, and
a bus switcher for, when a fault has occurred in one of the system buses, switching to the other system bus is provided between each of the control system CPU card and the standby system CPU card, and the system buses.

7. A control device comprising:
a control system CPU card including a control CPU chip having a control core and one or more standby cores, and a main memory for storing information;
a standby system CPU card including a standby CPU chip having a control core and one or more standby cores, and a main memory for storing information; and
an interface for performing communication to allow the control system CPU card and the standby system CPU card to share information, wherein
in the control system CPU card,
when the control core is normal, the control core performs control calculation and outputs a calculation result,
when the control core is abnormal, one of the one or more standby cores is switched to a core for control, to perform the control calculation and continue output of the calculation result, and
when the control core and the one or more standby cores are all abnormal, system switching is performed from the control system CPU card to the standby system CPU card, wherein each main memory has calculation data areas for separately storing calculation results of the control core and the one or more standby cores of the control system CPU card, and
the control core and the one or more standby cores of the control system CPU card perform the same control calculation and store the respective calculation results into the respective calculation data areas, and
when a fault has occurred in the calculation data area for the control core, the calculation result stored in the calculation data area for a standby core is stored into the calculation data area for the control core, whereby the control core continues the control calculation.

8. A control device comprising:
a control system CPU card including a control CPU chip having a control core and a standby core, and a main memory for storing information;
a standby system CPU card including a standby CPU chip having a control core and a standby core, and a main memory for storing information; and
an interface for performing communication to allow the control system CPU card and the standby system CPU card to share information, wherein
in the control system CPU card,
when the control core is normal, the control core performs control calculation and outputs a calculation result,
when the control core is abnormal, the standby core is switched to a core for control, to perform the control calculation and continue output of the calculation result, and
when the control core and the standby core are both abnormal, system switching is performed from the control system CPU card to the standby system CPU card, and wherein
each main memory has calculation data areas for separately storing calculation results of the control core and the standby core of the control system CPU card,
the control core and the standby core of the control system CPU card have cache memories for storing the respective calculation results,
each cache memory is set to a write-back mode,
the control core and the standby core of the control system CPU card perform the same control calculation and store the respective calculation results into the respective cache memories, and
when a fault has occurred in the cache memory of the control core of the control system CPU card,
the calculation result in the cache memory of the standby core of the control system CPU card is stored into the calculation data area for the standby core,
the stored calculation result in the calculation data area for the standby core of the control system CPU card is stored into the calculation data area for the control core of the control system CPU card, and
the stored calculation result in the calculation data area for the control core of the control system CPU card is stored into the cache memory of the control core of the control system CPU card, whereby the control core of the control system CPU card continues the control calculation.

* * * * *